US008717344B2

(12) United States Patent
Han et al.

(10) Patent No.: US 8,717,344 B2
(45) Date of Patent: May 6, 2014

(54) DISPLAY DEVICE AND DRIVING METHOD THEREFOR

(71) Applicant: Samsung Display Co., Ltd., Yongin (KR)

(72) Inventors: Jong-Heon Han, Hwaseong-si (KR); Seob Shin, Seoul (KR); Sung-Il Lee, Namyangju-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/931,630

(22) Filed: Jun. 28, 2013

(65) Prior Publication Data

US 2013/0293449 A1 Nov. 7, 2013

Related U.S. Application Data

(63) Continuation of application No. 11/931,648, filed on Oct. 31, 2007, now abandoned.

(30) Foreign Application Priority Data

Feb. 28, 2007 (KR) ........................ 10-2007-0020270

(51) Int. Cl.
*G02F 1/13* (2006.01)

(52) U.S. Cl.
USPC ............... 345/209; 345/204; 345/54; 345/79; 345/96; 345/690

(58) Field of Classification Search
USPC ................................... 345/87, 204, 690, 209
See application file for complete search history.

(56) References Cited

U.S. PATENT DOCUMENTS

| | | | | |
|---|---|---|---|---|
| 5,790,092 | A | 8/1998 | Moriyama | |
| 6,075,505 | A * | 6/2000 | Shiba et al. | 345/87 |
| 6,323,871 | B1 * | 11/2001 | Fujiyoshi et al. | 345/598 |
| 6,342,876 | B1 | 1/2002 | Kim | |
| 6,552,706 | B1 | 4/2003 | Ikeda et al. | |
| 6,707,441 | B1 | 3/2004 | Hebiguchi et al. | |
| 2003/0025662 | A1 | 2/2003 | Park | |
| 2004/0032386 | A1 * | 2/2004 | Pai | 345/96 |
| 2004/0189575 | A1 | 9/2004 | Choi et al. | |
| 2009/0102997 | A1 | 4/2009 | Wen et al. | |

* cited by examiner

*Primary Examiner* — Grant Sitta
(74) *Attorney, Agent, or Firm* — Innovation Counsel LLP

(57) ABSTRACT

A display device, includes: a plurality of thin film transistors which comprise a gate electrode, a source electrode and a drain electrode; a plurality of pixel electrodes which are respectively connected to the drain electrode of the thin film transistors; a plurality of gate lines which are respectively disposed to the opposite edge parts of the pixel electrodes in a lengthwise direction of the pixel electrodes, and connected to the gate electrode of the thin film transistors; and a plurality of data lines which are respectively disposed to a single edge part of the pixel electrodes in a widthwise direction of the pixel electrodes, and connected to the source electrode of the thin film transistors, a pair of pixel electrodes adjoining each other to interpose the single data line therebetween, and a pair of thin film transistors which are respectively connected to the pair of pixel electrodes being connected with the same single data line.

19 Claims, 12 Drawing Sheets

DISPLAY DEVICE AND DRIVING METHOD THEREFOR

CROSS-REFERENCE TO RELATED APPLICATIONS

This application is a continuation of U.S. patent application Ser. No. 11/931,648 filed on Oct. 31, 2007, which claims priority from Korean Patent Application No. 10-2007-0020270, filed on Feb. 28, 2007 in the Korean Intellectual Property Office, the disclosures of which are incorporated herein by reference.

BACKGROUND OF INVENTION

1. Field of Invention

This invention relates to display apparatus and, more particularly, to simplifying the configuration and improving the aperture ratio of the display.

2. Description of the Related Art

A liquid crystal display (LCD) panel having a plurality of thin film transistors, pixel electrodes, gate lines and data lines, etc. formed in the display area of the display device. An integrated driving circuit chip connected with the gate line, the data line, etc. may be mounted in a non-display area of the or formed integrally therewith as are various other circuits and a thin film wiring, etc. In a conventional display device, the presence of these components limits the ability to reduce the size of the non-display area. In addition, many of the integrated circuit driving chips are relatively expensive.

Also, in the conventional display device, the opaque data lines and gate lines are extended to surround the pixel electrodes thereby reducing the aperture ration.

SUMMARY OF THE INVENTION

In accordance with an aspect of the invention, the foregoing problems can be obviated by providing a display device, including: a plurality of thin film transistors each having a gate electrode, a source electrode and a drain electrode; a plurality of pixel electrodes respectively connected to the drain electrode of the thin film transistors; a plurality of gate lines respectively disposed lengthwise to the opposite edge parts of the pixel electrodes and connected to the gate electrodes of the thin film transistors; and a plurality of data lines respectively disposed widthwise to a single edge part of the pixel electrodes and connected to the source electrodes of the thin film transistors, a single data line being interposed between a pair of adjoining pixel electrodes, and a pair of thin film transistors respectively connected to the pair of pixel electrodes that are connected with the same single data line.

According to an aspect of the invention, the pair of thin film transistors which are connected to the single data line are connected with the different gate line.

According to an aspect of the invention, the gate line is disposed in a pair between the pixel electrodes arranged in the widthwise direction, and the data line is alternately disposed between the pixel electrodes arranged in the lengthwise direction.

According to an aspect of the invention, the pair of gate lines which are disposed between the pixel electrodes respectively are applied with a gate signal in different directions.

According to an aspect of the invention, the display device further includes an integrated driving circuit chip which is connected with the data lines, and a shift register which is respectively connected with the gate lines and the integrated driving circuit chip.

According to an aspect of the invention, the pair of pixel electrodes which face each other to interpose the single data line therebetween are applied with a data signal which has the same polarity.

According to an aspect of the invention, the pair of pixel electrodes are applied with the data signal which has different polarities from another pair of pixel electrodes vicinal in the lengthwise direction of the data lines.

According to an aspect of the invention, the polarity of the data signal which is applied from the single data line changes per two pixel electrodes.

According to an aspect of the invention, the data signal which has different polarities is alternately applied to per three pixel electrodes in the lengthwise direction of the data lines.

According to an aspect of the invention, the polarity of the data signal which is applied from the single data line changes per six pixel electrodes.

According to an aspect of the invention, all pixel electrodes which are connected with the single data line are applied with the data signal which has the same polarity.

According to an aspect of the invention, the pair of pixel electrodes which face each other to interpose the single data line therebetween are applied with the data signal which has different polarities.

According to an aspect of the invention, the pixel electrodes are applied with the data signal which has different polarities from other pixel electrodes vicinal in the lengthwise direction of the data lines.

According to an aspect of the invention, the polarity of the data signal which is applied from the single data line changes per two pixel electrodes from a second pixel electrode.

According to an aspect of the invention, the pixel electrodes which are arranged in the lengthwise direction of the data lines are applied with the data signal which has the same polarity.

According to an aspect of the invention, the polarity of the data signal which is applied from the single data line changes per one pixel electrode.

The foregoing and/or other aspects of the present invention can be achieved by providing a driving method of a display device which includes a plurality of pixel electrodes, a plurality of data lines which are disposed to a single edge part which crosses a lengthwise direction of the pixel electrodes, and a plurality of gate lines which are respectively disposed to the opposite edge parts which parallel the lengthwise direction of the pixel electrodes, the driving method including: applying a driving voltage to the pixel electrodes through the data lines by an inversion driving method.

According to an aspect of the invention, a pair of pixel electrodes which face each other to interpose the single data line therebetween are applied with a data signal which has the same polarity.

According to an aspect of the invention, the pair of pixel electrodes are applied with the data signal which has different polarities from another pair of pixel electrodes vicinal in the lengthwise direction of the data lines.

According to an aspect of the invention, the polarity of the data signal which is applied through the single data line changes per two pixel electrodes.

According to an aspect of the invention, the data signal which has different polarities is alternately applied to per three pixel electrodes in the lengthwise direction of the data lines.

According to an aspect of the invention, the polarity of the data signal which is applied through the single data line changes per six pixel electrodes.

According to an aspect of the invention, all pixel electrodes which are connected with the single data line are applied with the data signal which has the same polarity.

According to an aspect of the invention, the pair of pixel electrodes which face each other to interpose the single data line therebetween are applied with the data signal which has different polarities.

According to an aspect of the invention, the pixel electrodes are applied with the data signal which has different polarities from other pixel electrodes vicinal in the lengthwise direction of the data lines.

According to an aspect of the invention, the polarity of the data signal which is applied through the single data line changes per two pixel electrodes from a second pixel electrode.

According to an aspect of the invention, the pixel electrodes which are arranged in the lengthwise direction of the data lines are applied with the data signal which has the same polarity.

According to an aspect of the invention, the polarity of the data signal which is applied through the single data line changes per one pixel electrode.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION

As shown in the accompanying drawings, a display device using an amorphous silicon (a-Si) thin film transistor (TFT) formed by a five mask process is exemplarily described. Alternatively, the present invention may be applied to a display device of various types.

Figure 1:
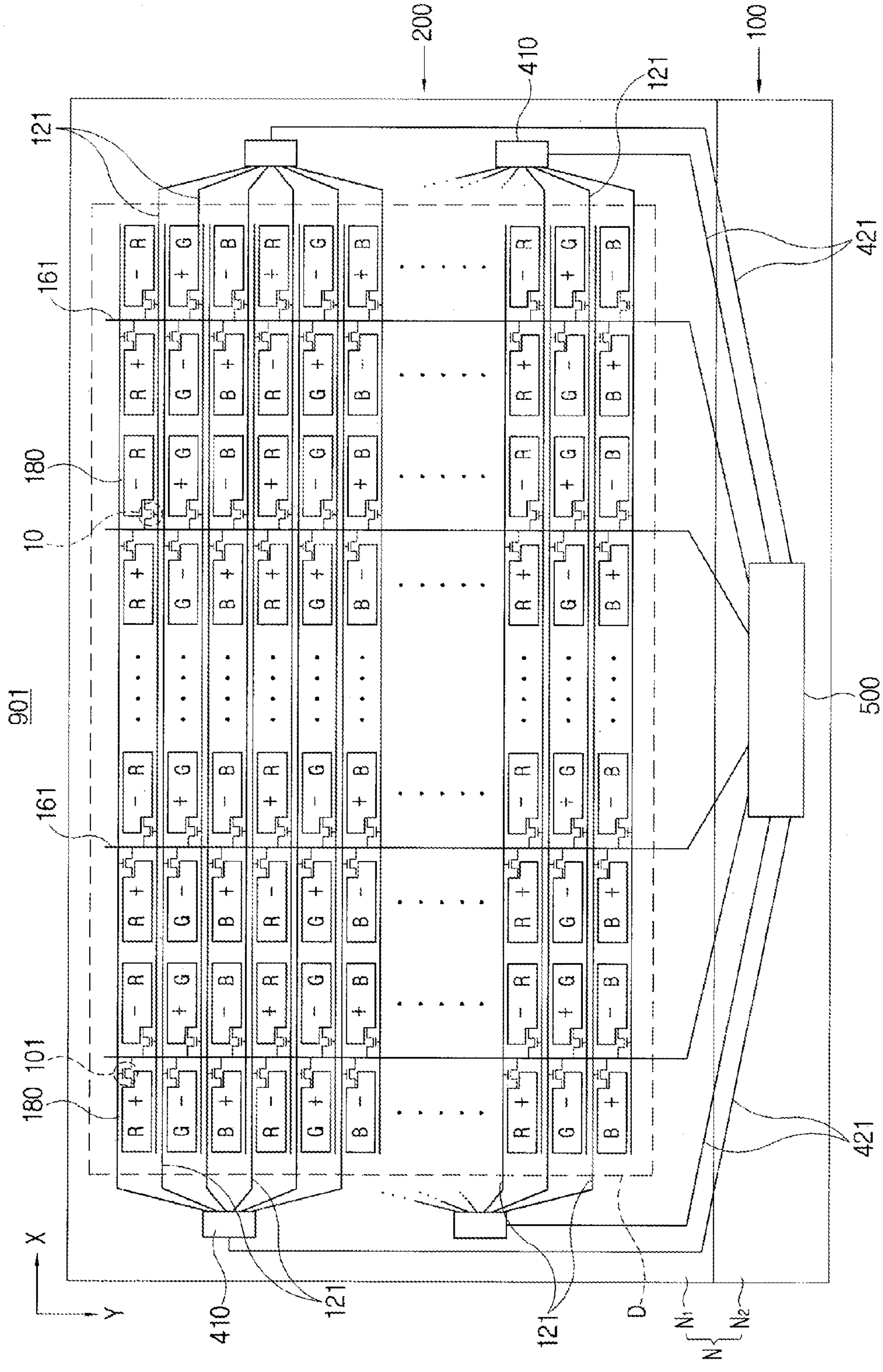
FIG. 1 is a equivalent circuit diagram of a display device according to a first exemplary embodiment of the present invention.
Figure 4:
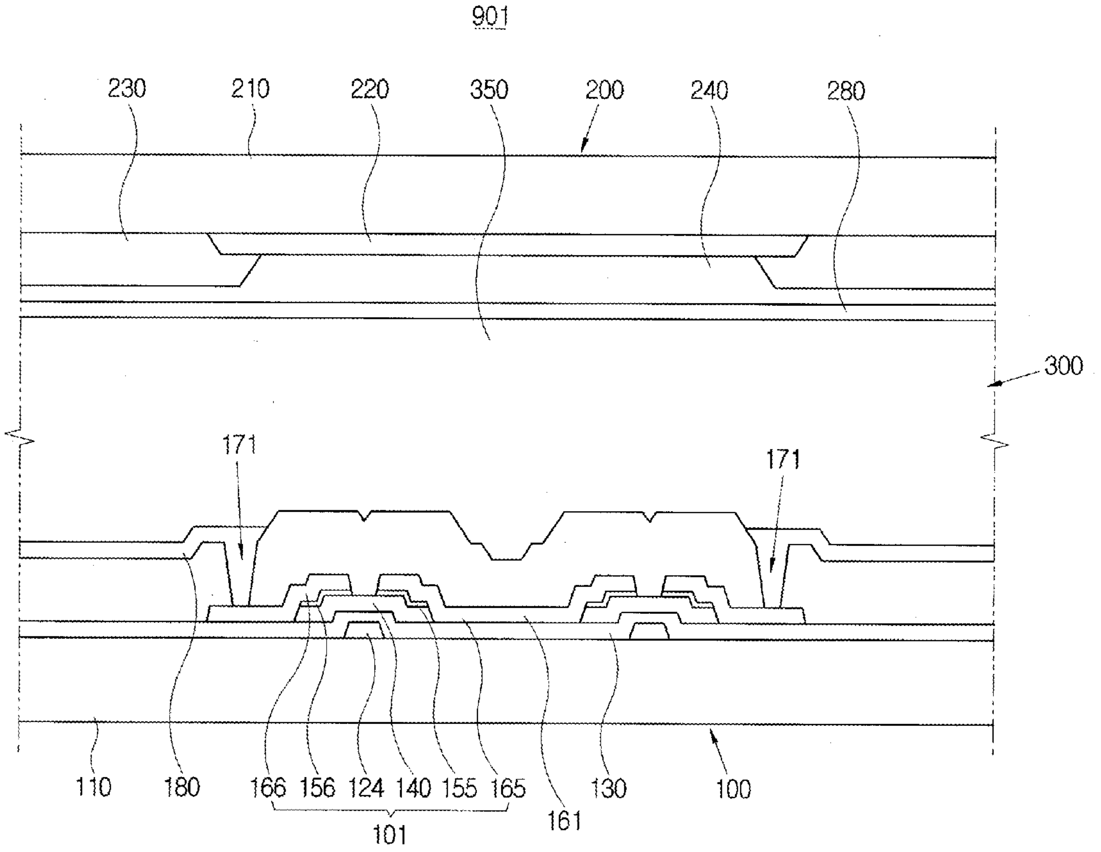
FIG. 4 is a sectional view illustrating the display device including the first display substrate in FIG. 1 taken along line IV-IV.

As shown in FIG. 1, a display device 901 includes a first display substrate 100, a second display substrate 200 adjoining the first display substrate 100, and a liquid crystal layer 300 shown in FIG. 4 disposed between the first display substrate 100 and the second display substrate 200. The second display substrate 200 has an area smaller than the first display substrate 100. Accordingly, an edge of the first display substrate 100 is not overlaid by the second display substrate 200, and other edges of the first display substrate 100 are overlaid by the second display substrate 200. Also, the display device 901 is divided into a display area D formed with a pixel, and a non display area N around the display area D. Here, the pixel refers to a minimum unit displaying an image.

The display area D is formed to an area in which the first display substrate 100 and the second display substrate 200 are overlaid each other, and the non display area N is divided into a first area N1 in which the display substrate 100 and the second display substrate 200 are overlaid each other, and a second area N2 in which only the first display substrate 100 is disposed.

Also, the display device 901 further includes an integrated driving circuit chip 500 mounted on the second area N2 in which only the first display substrate 100 is disposed. That is, the first display substrate 100 and the second display substrate 200 don't overlap each other in the second area N2.

The first display substrate 100 includes a plurality of thin film transistors (TFT) 101 formed to the display area D, a plurality of pixel electrodes 180, a plurality of gate lines 121, a plurality of data lines 161, etc.

Also, the first display substrate 100 further includes a thin film wiring 421, a shift register 410 and other circuit units formed to the non display area N. The thin film wiring 421 connects the integrated driving circuit chip 500 and the shift register 410 each other. The shift register 410 crosses an edge of the first display substrate 100 mounted with the integrated driving circuit chip 500, and is respectively formed to the opposite edges of the first display substrate 100. The shift register 410 supplies a gate signal received from the integrated driving circuit chip 500 to the plurality of gate lines 121 in sequence.

The data line 161 and the gate line 121 are extended from the display area D to the non display area N to be respectively connected with the integrated driving circuit chip 500 and the shift register 410.

The second display substrate 200 includes a light blocking member 220 shown in FIG. 4 formed to the display area D, a color filter 230 shown in FIG. 4, a common electrode 280 shown in FIG. 4, etc. Here, the color filter 230 is disposed to correspond to the pixel electrode 180. The color filter 230 includes the three primary colors of red, green and blue alternately arranged in at least one of a lengthwise direction (x-axis direction) and a widthwise direction (y-axis direction) of the pixel electrode. Also, the light blocking member 220, the common electrode 280, etc. are formed to the non display area N together.

Figure 3:
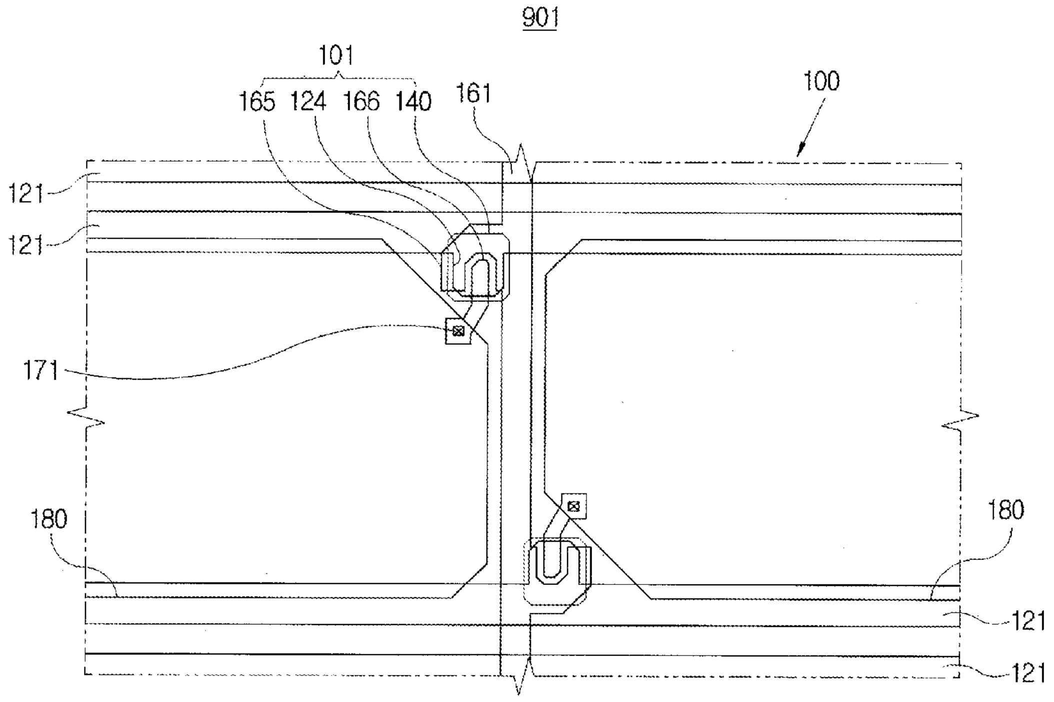
FIG. 3 is an arrangement diagram illustrating a part of the display device in FIG. 1 centering on a first display substrate.

The thin film transistor 101 includes a gate electrode 124 shown in FIG. 3, a source electrode 165 shown in FIG. 3 and a drain electrode 166 shown in FIG. 3. The pixel electrode 180 is connected to the drain electrode 166 of the thin film transistor 101. The gate line 121 is respectively disposed to the opposite edges of the pixel electrode 180 in the lengthwise direction (x-axis direction) of the pixel electrode 180, and is connected with the gate electrode 124 of the thin film transistor 101. The data line 161 is respectively disposed to only an edge of the pixel electrode 180 in the widthwise direction (y-axis direction) of the pixel electrode 180, and is connected with the source electrode 165 of the thin film transistor 101.

That is, a pair of gate lines 121 are disposed between the pixel electrodes 180 neighboring in the widthwise direction (y-axis direction). A pair of pixel electrodes 180 neighboring in the lengthwise direction (x-axis direction) is disposed between the neighboring data lines 161. Here, the length of the pixel electrode 180 in the lengthwise direction is bigger than the length thereof in the widthwise direction.

Here, the two gate lines 121 disposed between the pixel electrodes 180 respectively transmit a gate signal in different directions. That is, one of the two gate lines 121 disposed between the pixel electrodes 180 is connected with the shift register 410 formed to a first edge of the first display substrate 100. Also, the other of the two gate lines 121 disposed between the pixel electrodes 180 is connected with the shift register 410 formed to a second edge of the first display substrate 100 adjoining the first edge.

Also, a pair of adjoining pixel electrodes 180 interpose a single data line 161 therebetween. Here, a pair of thin film transistors 101 respectively connected to the pair of pixel electrodes 180 are connected with the same single data line 161. Also, the pair of thin film transistors 101 connected to the single data line 161 are connected with different gate lines 121.

With this configuration, the total number of the data line 161 can be reduced without deteriorating resolution of the display device 901. Accordingly, the display device 901 can simplify the configuration thereof, slim the appearance thereof, and improve aperture ratio.

That is, in comparison with the pixel electrode 180, the display device 901 can significantly reduce the total number of the data line 161. In detail, since the data line 161 is disposed in the lengthwise direction of the pixel electrode 180, the total number of the data line 161 can be reduced in comparison with a case in which the data line 161 is disposed in the widthwise direction of the pixel electrode 180. Also, the data line 161 is alternately disposed between the pixel electrodes 180 arranged in the lengthwise direction (x-axis direction). Accordingly, the total number of the data line 161 can be reduced by half in comparison with a case in which the data line 161 is disposed between the pixel electrodes 180 without omission.

On the other hand, since the gate line 121 is arranged in the widthwise direction of the pixel electrode 180, the number of the gate line 121 relatively increases in comparison with a case in which the gate line 121 is arranged in the lengthwise direction of the pixel electrode 180.

However, the gate signal transmitted through the gate line 121 is relatively simple in comparison with a data signal transmitted through the data line 161. Accordingly, the total number of the integrated driving circuit chip 500 necessary to supply the data signal and the gate signal through the data line 161 and the gate line 121 can be reduced. Also, productivity of the display device 901 can be improved by reducing use of the integrated driving circuit chip 500 relatively expensive.

Also, since the gate line 121 receives the gate signal from the shift register 410 respectively formed to the opposite edges of the first display substrate 100, use of the integrated driving circuit chip 500 for supplying the gate signal can be significantly reduced.

Accordingly, in the display device 901, the ratio of the non display area N compared with the display area D can be reduced. Accordingly, the display device 901 can be further slimmed.

Also, as the number of the data line 161 is reduced, an area occupied by the pixel electrode 180 can be widened, thereby improving aperture ratio.

Hereinafter, a driving method of the display device 901 according to the first exemplary embodiment of the present invention will be described centering on a data signal.

As shown in FIG. 1, a pair of pixel electrodes 180 adjoining each other having a single data line 161 therebetween are supplied with a data signal having different polarity from the same data line. Also, the pixel electrode 180 is applied with the data signal having different polarity from another pixel electrode 180 adjacent in the lengthwise direction of the data line 161. Here, the data signal includes a driving voltage applied to the pixel electrode 180 through the thin film transistor 101.

Figure 2:
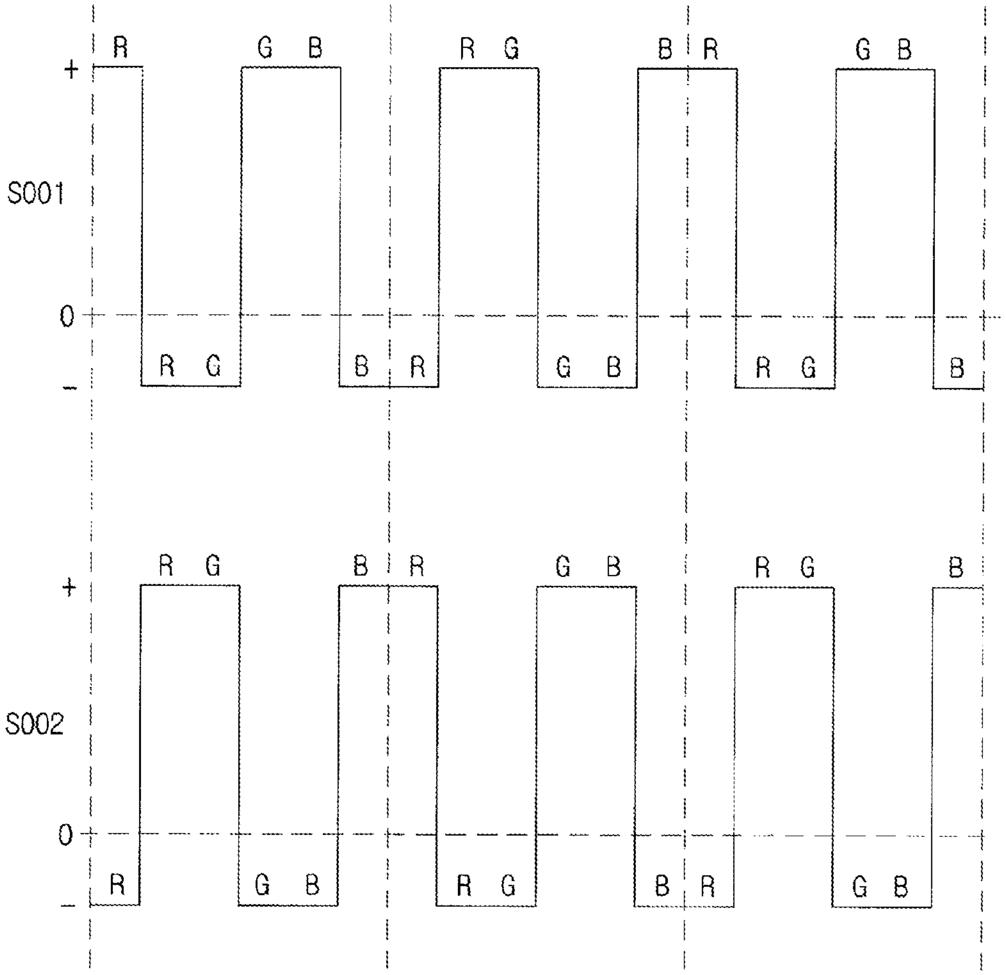
FIG. 2 illustrates a data signal applied to the display device in FIG. 1.

FIG. 2 illustrates the data signal applied through the data line 161. S001 refers to the data signal applied through a first data line 161, and S002 refers to the data signal applied through a second data line 161.

As shown in FIG. 2, the polarity of the data signal applied from the single data line 161 to a first pixel electrode 180 and a second pixel electrode 180 is changed each other. Also, the polarity is changed from the second pixel electrode 180 per two pixel electrode 180. Accordingly, the display device 901 shown in FIG. 1 seems to be driven by a 1dot inversion driving method, but substantially, is driven like a 2 dot inversion driving method.

With this driving method, the display device 901 can display an image having the same resolution with substantially reducing the number of the data line 161 by half.

Hereinafter, a configuration of the display device 901 will be described in detail by referring to FIGS. 3 and 4. FIG. 3 is an arrangement diagram illustrating a part of the display device 901 centering on the first display substrate 100. FIG. 4 is a sectional view illustrating the display device 901 including the first display substrate 100 in FIG. 3 taken along line IV-IV.

At first, the first display substrate 100 will be described in detail.

A first substrate member 110 includes material such as glass, quartz, ceramic, plastic, etc., and is formed to be transparent.

A gate wiring including a plurality of gate lines 121, and a plurality of gate electrodes 124 branched from the gate line 121 is formed on the first substrate member 110. The gate wiring may further include a plurality of first storage electrode lines (not shown).

The gate wiring 121 and 124 is formed of metal such as Al, Ag, Cr, Ti, Ta, Mo, etc., or an alloy including the above metals. As shown in FIG. 2, the gate wiring 121 and 124 is provided as a single layer. Alternatively, the gate wiring 121 and 124 may be formed as multi layers including a metal layer of Cr, Mo, Ti, Ta having a superior physical chemistry property, or an alloy including the above metals, and a metal layer of Al series or Ag series having a small specific resistance. Alternatively, the gate wiring 121 and 124 may be formed of various metals or electrical conductors, and may be preferably but not necessarily provided as multi layers being capable of being patterned under the same etching condition.

A gate insulating layer 130 is formed of silicon nitride (SiNx), etc. on the gate wiring 121 and 124.

A data wiring including a plurality of data lines 161 crossing the gate line 121, a plurality of source electrodes 165 branched from the data line 161 so that at least a part thereof can be overlaid with the gate electrode 124, and a plurality of drain electrodes 166 distanced from the source electrode 165 so that at least a part thereof can be overlaid with the gate electrode 124 is formed over the gate insulating layer 130. Also, the data wiring may further include a plurality of second storage electrode lines (not shown).

The data wiring 161, 165 and 166 is formed of an electrical conductive material such as chrome, molybdenum, aluminum, or an alloy including the above metals, and may be provided as a single layer or multi layers like the gate wiring 121 and 124.

A semiconductor layer 140 is formed to an area covering from an upper part of the source electrode 165 over the gate electrode 124 to a lower part of the source electrode 165 and the drain electrode 166. Here, the gate electrode 124, the source electrode 165 and the drain electrode 166 are employed for three electrodes of the thin film transistor 101. The semiconductor layer 140 between the source electrode 165 and the drain electrode 166 is employed for a channel area of the thin film transistor 101.

Here, as shown in FIG. 1, a pair of pixel electrodes 180 face to interpose a single data line 161 therebetween. Here, a pair of thin film transistors 101, the drain electrodes 166 of which are respectively connected to the pair of pixel electrodes 180 are connected with the same single data line 161. Also, the gate electrodes 124 of the pair of thin film transistors 101, the source electrodes 165 of which are connected to the single data line 161 are connected with different gate lines 121.

Also, an ohmic contact 155 and 156 is formed between the semiconductor layer 140 and the source electrode 165, and between the semiconductor layer 140 and the drain electrode 165 to respectively reduce a contact resistance. The ohmic contact 155 and 156 is formed of silicide or amorphous silicon doped with an n-type impurity of high density, or the like.

On the data wiring 161, 165 and 166, a passivation layer 170 is formed of a low dielectric constant insulating material such as a-Si:C:O, a-Si:O:F, etc., or an inorganic insulating material such as silicon nitride, silicon oxide, etc. by mean of a plasma enhanced vapor deposition (PECVD).

A plurality of pixel electrodes 180 are formed on the passivation layer 170. The pixel electrode 180 includes a transparent conductive material such as indium tin oxide (ITO), indium zinc oxide (IZO) or the like.

Also, the pixel electrode 180 may further include an opaque conductive material having a superior light reflecting property such as aluminum, etc. according to the type of a display panel.

Also, the passivation layer 170 includes a plurality of contact holes 171 exposing a part of the drain electrode 166. The pixel electrode 180 and the drain electrode 166 are electrically connected through the contact hole 171.

Hereinafter, the second display substrate 200 will be described in detail.

A second substrate member 210 includes material such as glass, quartz, ceramic, plastic, etc. to be transparent like the first substrate member 110.

The light blocking member 220 is formed on the second substrate member 210. The light blocking member 220 includes an opening part facing the pixel electrode 180 of the first display substrate 100, and intercepts a light leaking between vicinal pixels. The light blocking member 220 is formed to a position corresponding to the thin film transistor 10 for blocking an external light entering the semiconductor layer 140 of the thin film transistor 10. The light blocking member 220 may be formed of a photoresist organic material added with black pigment. Here, the black pigment may employ carbon black, titanium oxide, etc. Also, the light blocking member 220 may be formed of a metallic material.

The color filter 230 having the three primary colors is disposed in order over the second substrate member 210 formed with the light blocking member 220. Here, the color filter 230 may have at least one various color instead of the three primary colors. A boundary of each color filter 230 is positioned over the light blocking member 220. Alternatively, edge parts of the vicinal color filters 230 may be overlaid to accomplish a function like the light blocking member 220 blocking a leaking light. Here, the light blocking member 220 may be omitted.

A planarization film 240 is formed over the light blocking member 220 and the color filter 230. The planarization film 240 may be omitted.

The common electrode 280 is formed over the planarization film 240 to form an electric field together with the pixel electrode 180. The common electrode 280 is formed of a transparent conductive material such as ITO, IZO or the like.

With this configuration, the total number of the data line 161 can be relatively reduced with maintaining resolution of the display apparatus 901. Accordingly, the configuration of the display apparatus 901 can be simplified, the external appearance thereof can be slimmed, and aperture ratio thereof can be improved.

Hereinafter, a driving method of a display apparatus 902 according to a second exemplary embodiment of the present invention will be described centering on a data signal by referring to FIGS. 5 and 6.

Figure 5:
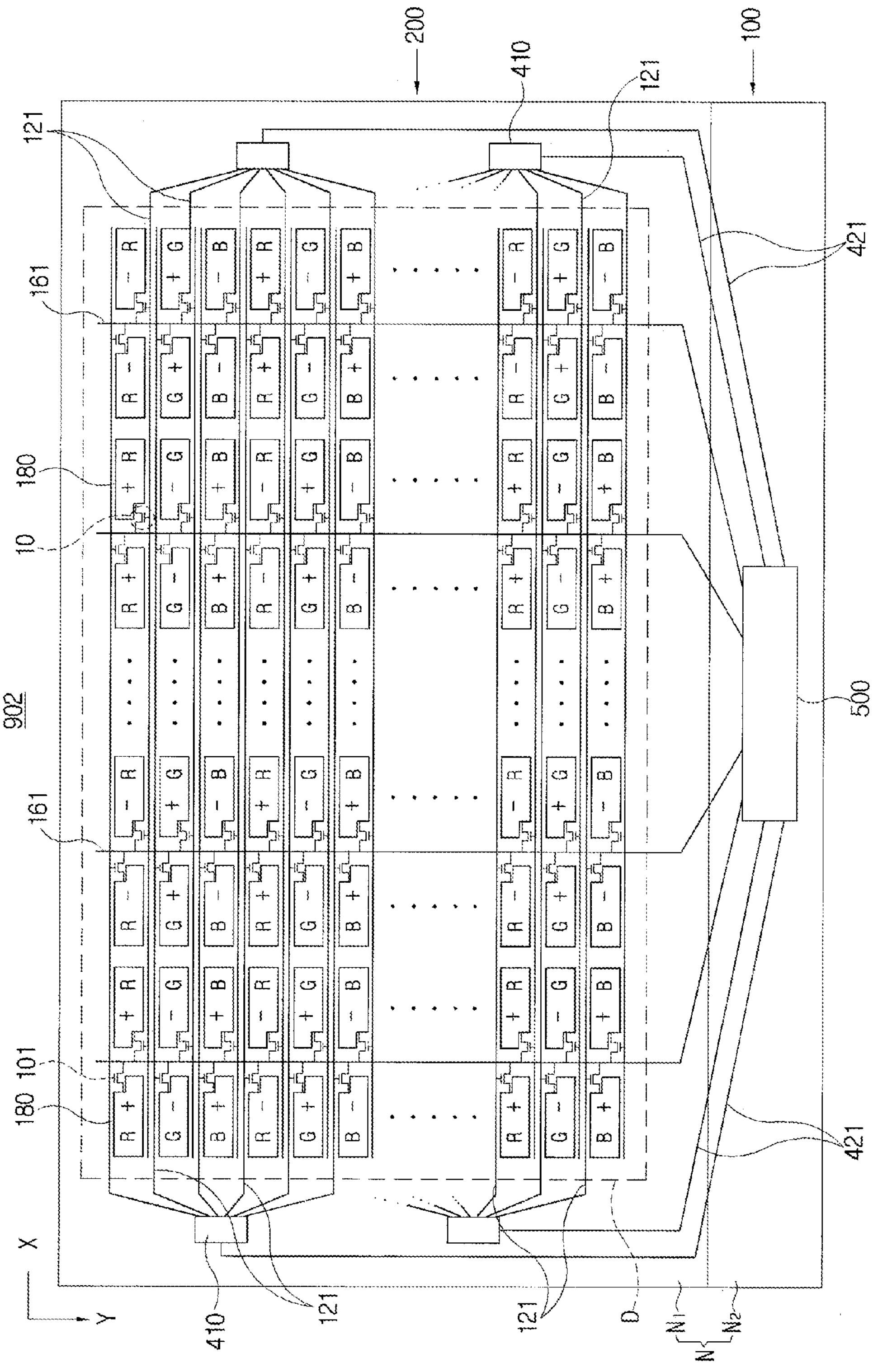
FIG. 5 is a equivalent circuit diagram of a display device according to a second exemplary embodiment of the present invention.

As shown in FIG. 5, a pair of pixel electrodes 180 adjoining each other to interpose a single data line 161 therebetween are applied with a data signal having the same polarity from the same data line 161. The pair of pixel electrodes 180 are applied with the data signal having different polarities from another pair of pixel electrodes 180 adjacent in a lengthwise direction of the data line 161.

Figure 6:
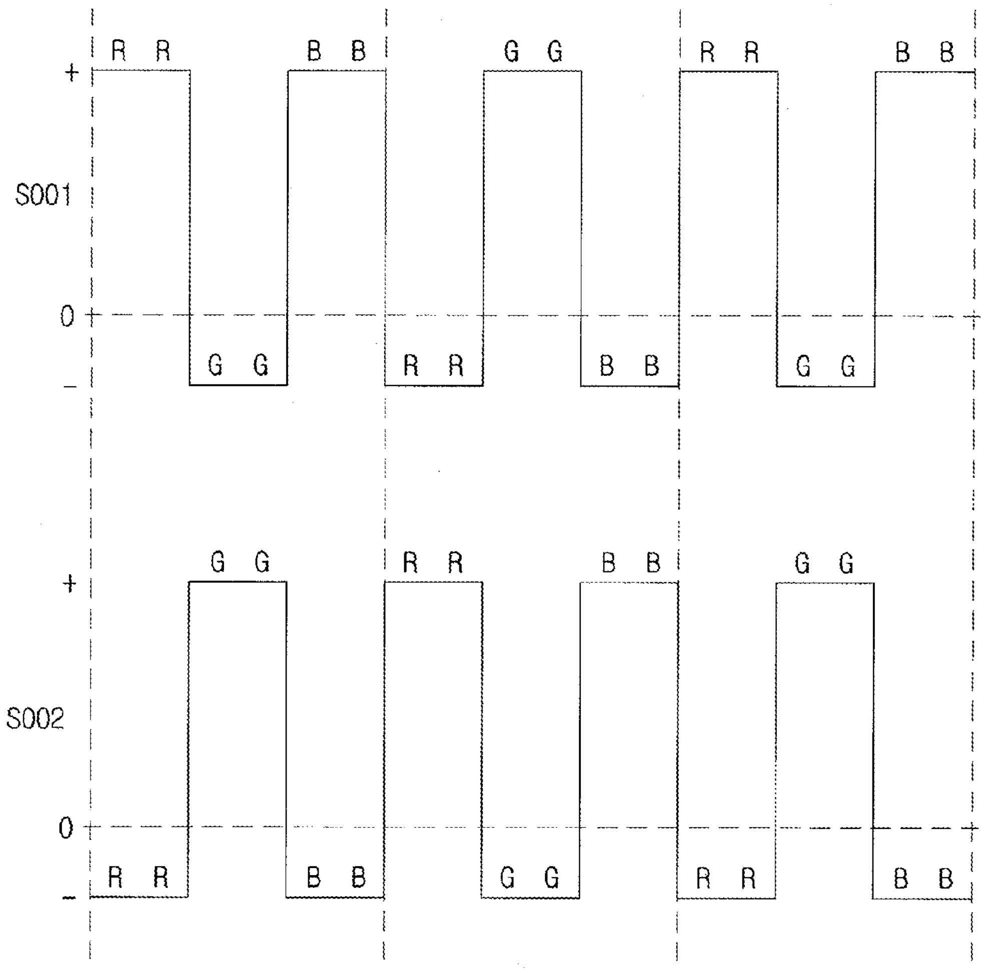
FIG. 6 illustrates a data signal applied to the display device in FIG. 5.

FIG. 6 illustrates the data signal applied through the data line 161. S001 refers to the data signal applied through a first data line 161, and S002 refers to the data signal applied through a second data line 161.

As shown in FIG. 6, the polarity of the data signal applied from the single data line 161 is changed per two pixel electrode 180. That is, the display apparatus 902 is driven by a 2dot inversion driving method.

With this driving method, the display device 902 can display an image having the same resolution with substantially reducing the number of the data line 161 by half.

Hereinafter, a driving method of a display apparatus 903 according to a third exemplary embodiment of the present invention will be described centering on a data signal by referring to FIGS. 7 and 8.

Figure 7:
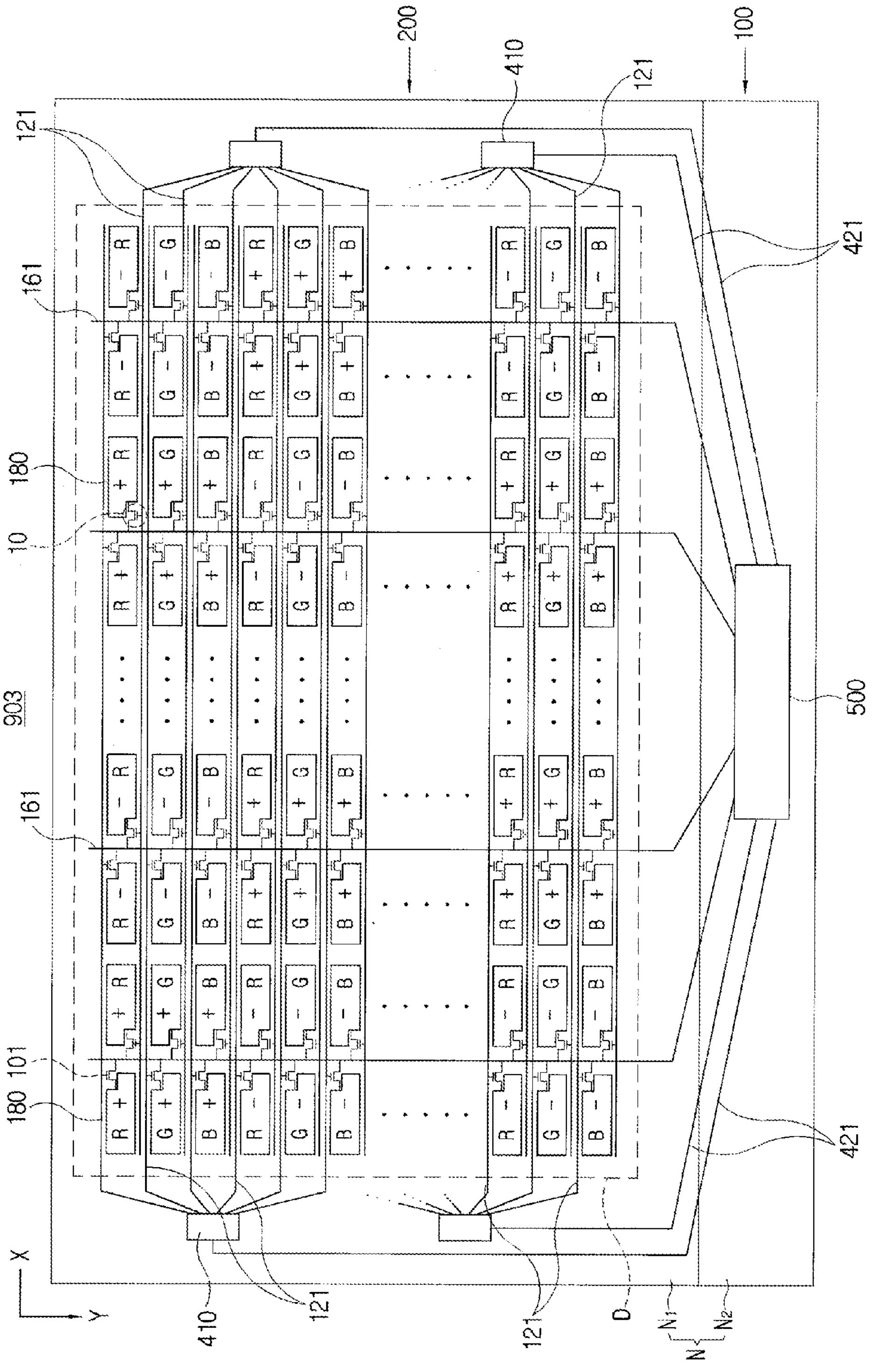
FIG. 7 is a equivalent circuit diagram of a display device according to a third exemplary embodiment of the present invention.

As shown in FIG. 7, a pair of pixel electrodes 180 adjoining each other to interpose a single data line 161 therebetween are applied with a data signal having the same polarity from the same data line 161. The data signal having different polarities is alternately applied to per three pairs of pixel electrodes 180 in a lengthwise direction of the data line 161.

Figure 8:
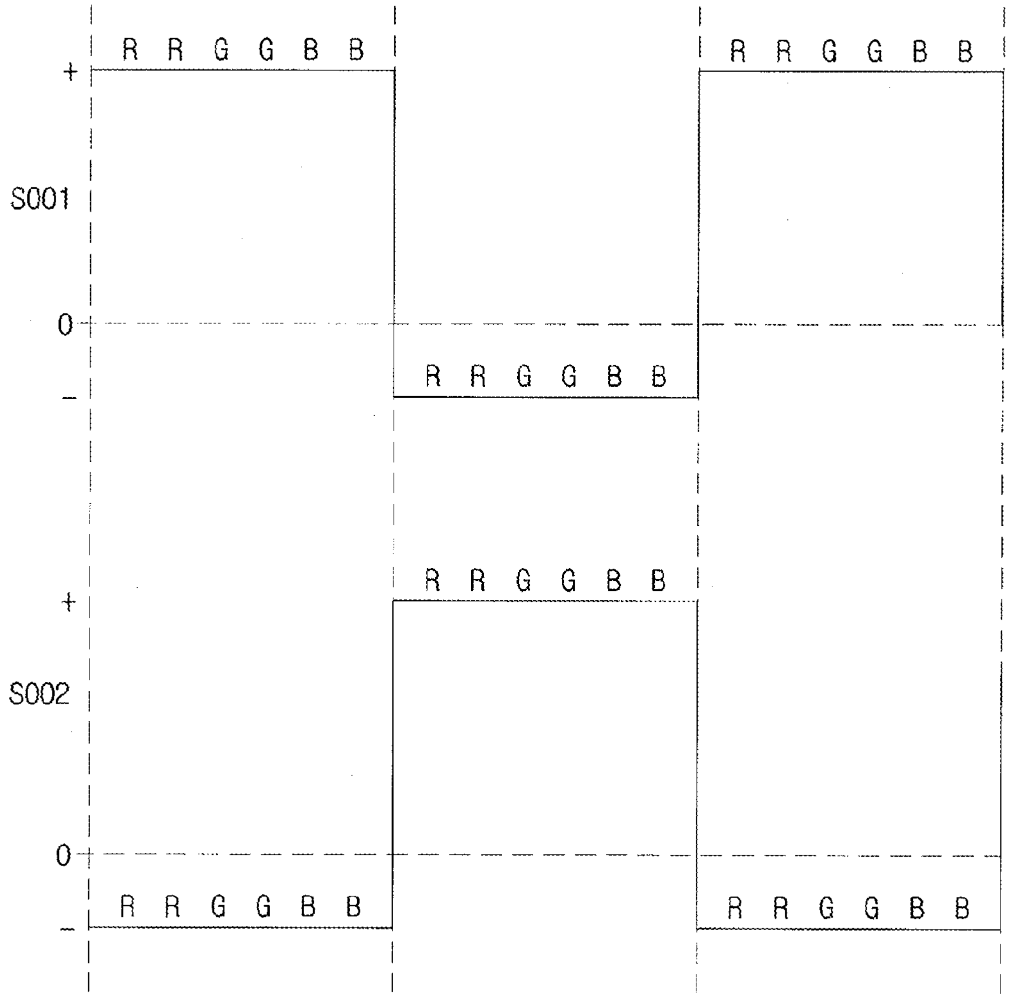
FIG. 8 illustrates a data signal applied to the display device in FIG. 7.

FIG. 8 illustrates the data signal applied through the data line 161. S001 refers to the data signal applied through a first data line 161, and S002 refers to the data signal applied through a second data line 161.

As shown in FIG. 8, the polarity of the data signal applied from the single data line 161 is changed per six pixel electrode 180. That is, the display apparatus 903 is driven by a 6dot inversion driving method.

With this driving method, the display device 903 can display an image having the same resolution with substantially reducing the number of the data line 161 by half.

Hereinafter, a driving method of a display apparatus 904 according to a fourth exemplary embodiment of the present invention will be described centering on a data signal by referring to FIGS. 9 and 10.

Figure 9:
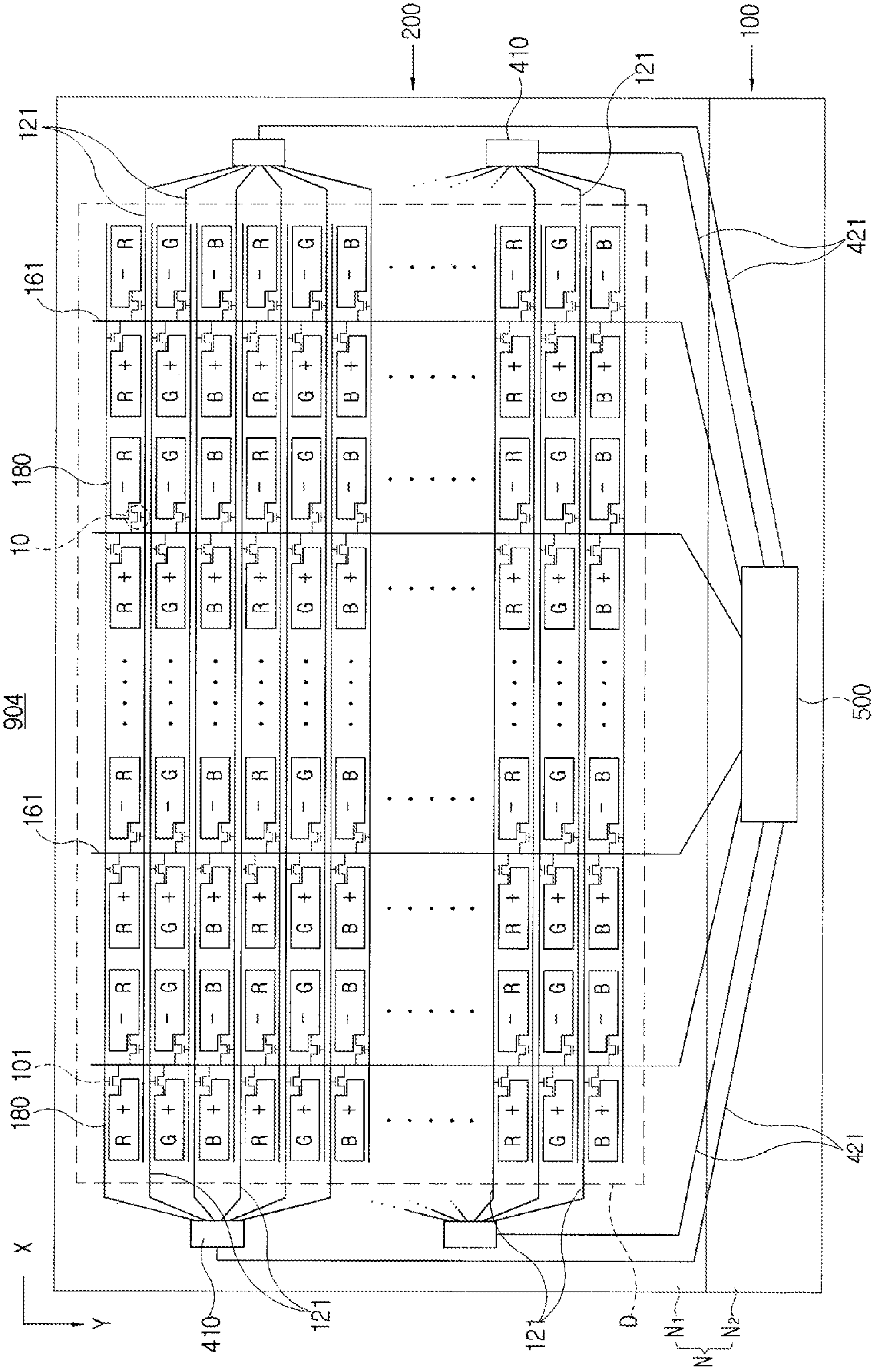
FIG. 9 is a equivalent circuit diagram of a display device according to a fourth exemplary embodiment of the present invention.

As shown in FIG. 9, a pair of pixel electrodes 180 adjoining each other to interpose a single data line 161 therebetween are applied with a data signal having different polarities from the same data line 161. Also, the pixel electrodes 180 arranged in a lengthwise direction of the data line 161 are applied with the data signal having the same polarity.

Figure 10:
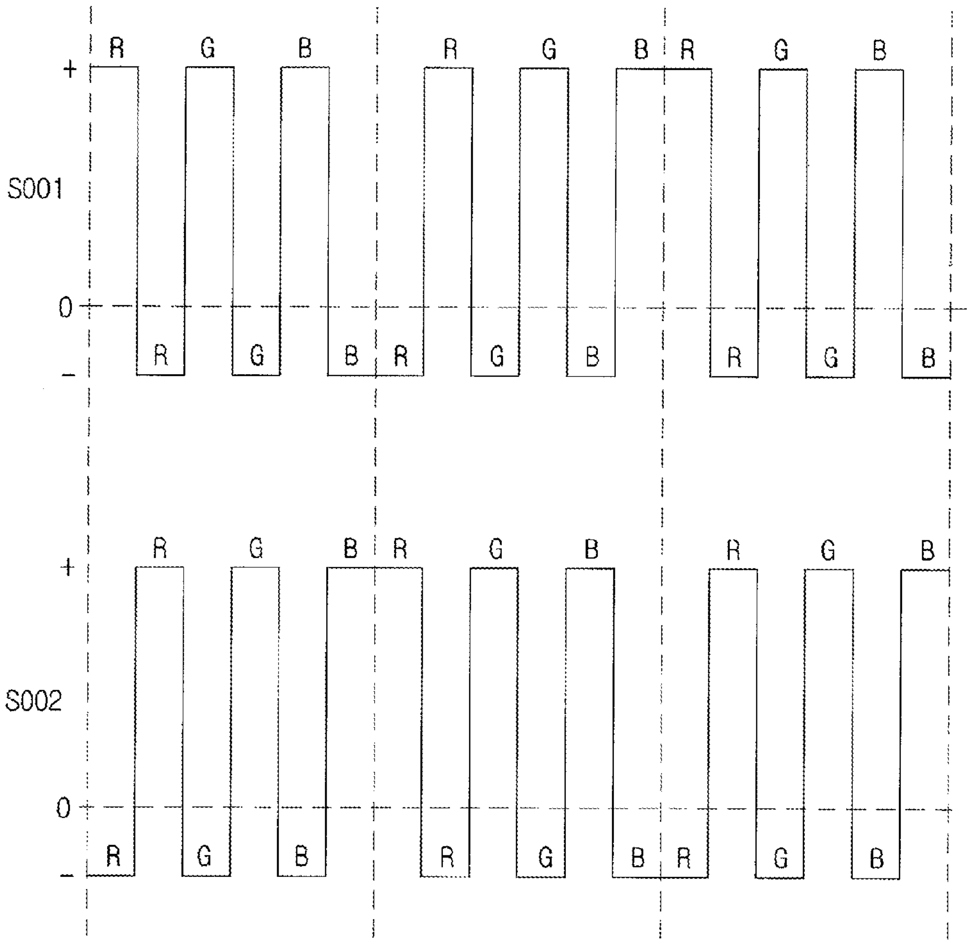
FIG. 10 illustrates a data signal applied to the display device in FIG. 9.

FIG. 10 illustrates the data signal applied through the data line 161. S001 refers to the data signal applied through a first data line 161, and S002 refers to the data signal applied through a second data line 161.

As shown in FIG. 10, the polarity of the data signal applied from the single data line 161 is changed per one pixel electrode 180. Accordingly, the display apparatus 904 shown in FIG. 9 seems to be driven by a column inversion driving method, but substantially, is driven like a 1dot inversion driving method.

With this driving method, the display device 904 can display an image having the same resolution with substantially reducing the number of the data line 161 by half.

Hereinafter, a driving method of a display apparatus 905 according to a fifth exemplary embodiment of the present invention will be described centering on a data signal by referring to FIGS. 11 and 12.

Figure 11:
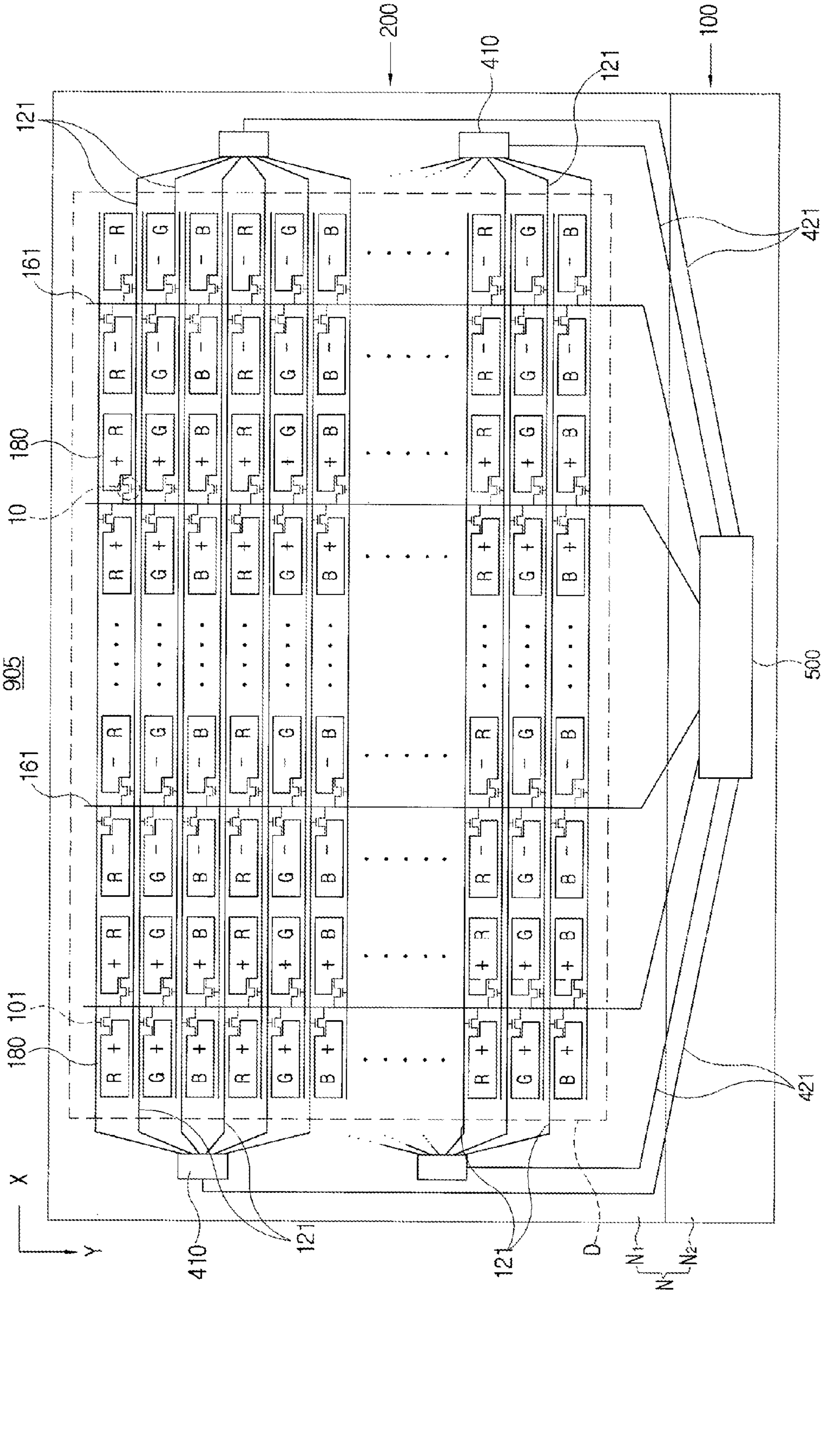
FIG. 11 is a equivalent circuit diagram of a display device according to a fifth exemplary embodiment of the present invention.

As shown in FIG. 11, a pair of pixel electrodes 180 adjoining each other to interpose a single data line 161 therebetween are applied with a data signal having the same polarity from the same data line 161. The pixel electrodes 180 arranged in a lengthwise direction of the data line 161 are applied with the data signal having the same polarity.

Figure 12:
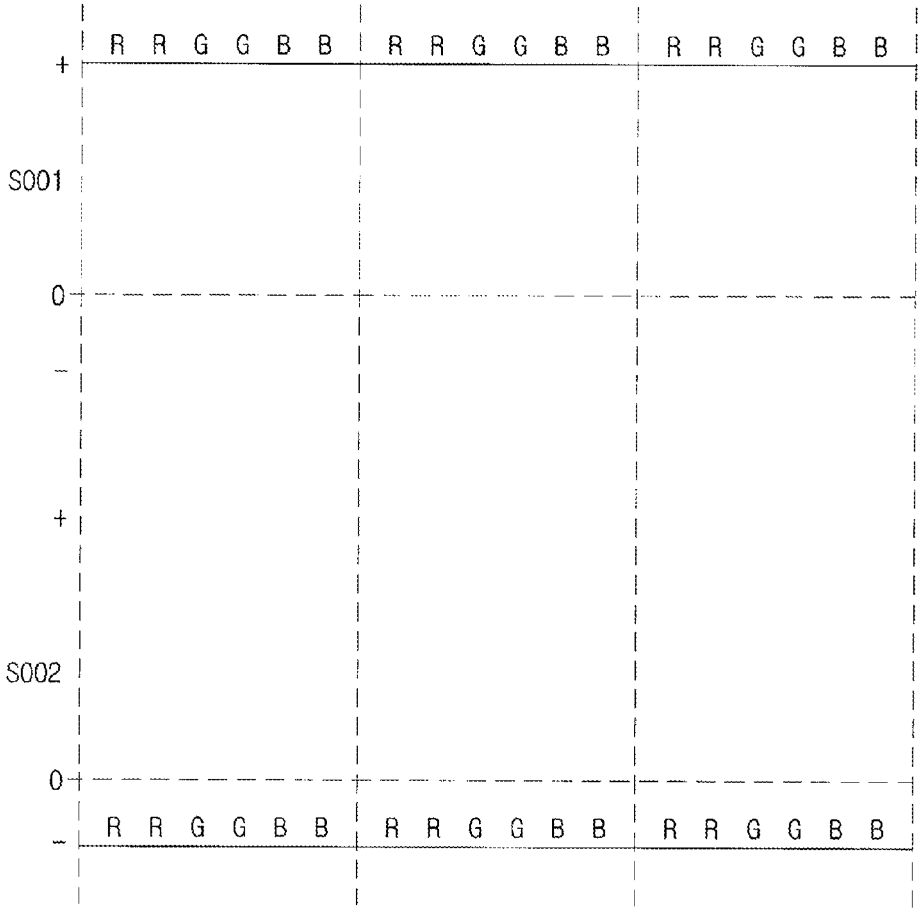
FIG. 12 illustrates a data signal applied to the display device in FIG. 11.

FIG. 12 illustrates the data signal applied through the data line 161. S001 refers to the data signal applied through a first data line 161, and S002 refers to the data signal applied through a second data line 161.

As shown in FIG. 12, all pixel electrodes 180 connected with the single data line 161 are applied with the data signal having the same polarity. Accordingly, the display apparatus 905 is driven by a column inversion driving method.

With this driving method, the display device 905 can display an image having the same resolution with substantially reducing the number of the data line 161 by half.

In the several exemplary embodiments of the present invention, a pair of pixel electrodes 180 adjoining each other to interpose a single data line 161 therebetween may be more preferably but not necessarily applied with a data signal having the same polarity than a data signal having different polarities from the same data line 161. If a polarity inversion period of the data signal is excessively short, inferiority due to a signal delay may happen.

As described above, the present invention provides a display device relatively reducing the number of data lines with maintaining resolution of the display device. Accordingly, the configuration of the display device can be simplified, and aperture ratio thereof can be improved.

That is, the display device can reduce the total number of integrated driving circuit chips by significantly reducing the number of the data lines in comparison with a pixel electrode. Accordingly, productivity of the display device can be improved by reducing a use of the integrated driving circuit chip relatively expensive.

Also, the use of the integrated driving circuit chip can be further minimized by transmitting a gate signal to a gate line by using a shift register.

Also, ratio of a non display area compared with a display area can be reduced. Accordingly, the display device can have an external appearance further slimmed.

Also, an area occupied by a pixel electrode can be widened as the number of a data line decreases. Accordingly, aperture ratio of the display device can be improved.

Also, the present invention provides a driving method of the display device.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display device comprising:

a first gate line extending in a first direction and configured to transmit a first gate signal;

a second gate line extending in the first direction and configured to transmit a second gate signal;

a first transistor that comprises a first source electrode, a first drain electrode, and a first gate electrode that is electrically connected to the first gate line;

a second transistor that comprises a second source electrode, a second drain electrode, and a second gate electrode that is electrically connected to the second gate line;

a first pixel electrode disposed between the first gate line and the second gate line in a circuit diagram of the display device and electrically connected to the first drain electrode;

a second pixel electrode disposed between the first gate line and the second gate line in the circuit diagram of the display device and electrically connected to the second drain electrode; and a first data line extending in a second direction, disposed between the first pixel electrode and the second pixel electrode in the circuit diagram of the display device, and configured to transmit a first data signal, wherein each of the first source electrode and the second source electrode is electrically connected to the first data line, and wherein a data signal which is applied from data line has a first polarity for both pixel electrodes in three consecutive pairs of pixel electrodes and has a second polarity for both pixel electrodes in a fourth pair of pixel electrodes that immediately follows the three consecutive pairs of pixel electrodes.

2. The display device according to claim 1, further comprising:

a second data line extending in the second direction and configured to transmit a second data signal;

a third transistor electrically connected to the second data line; and a third pixel electrode electrically connected to the third transistor, wherein the second pixel electrode is disposed between the first pixel electrode and the third pixel electrode, wherein the second pixel electrode and the third pixel electrode are disposed between the first data line and the second data line in the circuit diagram of the display device, and wherein no data line is disposed between the second pixel electrode and the third pixel electrode in the circuit diagram of the display device.

3. The display device according to claim 2, wherein the third transistor is electrically connected to the first gate line.

4. The display device according to claim 2, further comprising:

a first shift register configured to provide the first gate signal to the first gate line;

a second shift register configured to provide the second gate signal to the second gate line, wherein the first data line is disposed between the first shift register and the second shift register in the circuit diagram of the display device.

5. The display device according to claim 4, further comprising a driving chip that is electrically connected to each of the first shift register, the second shift register, and the first data line.

6. The display device according to claim 2,further comprising:

a first color filter corresponding to the first pixel electrode; and a second color filter corresponding to the second pixel electrode, wherein a color of the first filter is the same as a color of the second color filter, wherein the first pixel electrode is aligned with the second pixel electrode in the first direction, and wherein a length of the first pixel electrode in the first direction is larger than a length of the first pixel electrode in the second direction.

7. The display device according to claim 2, wherein the third pixel electrode is configured to receive a portion of the second data signal, and wherein a polarity of the first portion of the first data signal is different from a polarity of the portion of the second data signal.

8. The display device according to claim 6, further comprising a third color filter corresponding to the third pixel electrode, wherein a color of the third color filter is same as each of the color or the first color filter and the color of the second color filter.

9. The display device according to claim 2, further comprising:

a third gate line extending in the first direction and configured to transmit a third gate signal;

a fourth transistor electrically connected to each of the third gate line and the first data line; and a fourth pixel electrode electrically connected to the fourth transistor; and a fourth color filter corresponding to the fourth pixel electrode, wherein the second gate line and the third gate line are disposed between the first pixel electrode and the fourth pixel electrode, wherein the fourth pixel electrode is aligned with the first pixel electrode in the second direction, and wherein a color of the fourth color filter is different from the color of the first color filter.

10. The display device according to claim 1, comprising a plurality of pixel electrode sets aligned in the second direction.

11. The display device according to claim 10, wherein each pixel electrode set of the pixel electrode sets includes three consecutive pixel electrodes aligned in the second direction, wherein the pixel electrode sets includes a first pixel electrode set and a second pixel electrode set that immediately neighbors the first pixel electrode set, wherein the first pixel electrode set is configured to receive a first data signal portion having a positive polarity, and wherein the second pixel electrode set is configured to receive a second data signal portion having a negative polarity.

12. The display device according to claim 11, wherein each of the pixel electrode sets is electrically connected to the first data line.

13. The display device according to claim 12, further comprising a shift register, wherein the three pixel electrodes of the first pixel electrode set are respectively connected to a three thin film transistors, and wherein the three thin film transistors are respectively connected to three gate lines that are electrically connected to the shift register.

14. The display device according to claim 13, wherein the three consecutive pixel electrodes of the first pixel set sequentially correspond to a first red color filter, a first green color filter, and a first blue color filter.

15. The display device according to claim 14, wherein the three consecutive pixel electrodes of the second pixel set sequentially correspond to a second red color filter, a second green color filter, and a second blue color filter.

16. The display device according to claim 13, wherein the first pixel electrode set includes the first pixel electrode.

17. The display device according to claim 11, further comprising a third pixel electrode set that includes three consecutive pixel electrodes aligned in the second direction, wherein the third pixel electrode set immediately neighbors the first pixel electrode set and is aligned with the first pixel electrode set in the first direction, wherein the first data line is disposed between the first pixel electrode set and the third pixel electrode set, and wherein the third pixel electrode set is configured to receive a third data signal portion having the positive polarity.

18. The display device according to claim 17, wherein the first pixel electrode set includes the first pixel electrode and is electrically connected to gate lines that are electrically connected to a first shift register, and wherein the third pixel electrode set includes the second pixel electrode and is electrically connected to gate lines that are electrically connected to a second shift register.

19. The display device according to claim 17, wherein an arrangement of color filters corresponding to the first pixel electrode set is same as an arrangement of color filters corresponding to the third pixel electrode set.

* * * * *